United States Patent
Hirtreiter et al.

[11] 3,897,941
[45] Aug. 5, 1975

[54] REINFORCED FLUID SPRING

[75] Inventors: Arthur B. Hirtreiter; Karl K. Kluss, both of Akron, Ohio

[73] Assignee: The Goodyear Tire & Rubber Company, Akron, Ohio

[22] Filed: Mar. 28, 1974

[21] Appl. No.: 455,756

[52] U.S. Cl. ............................................. 267/65 B
[51] Int. Cl. ................................................ F16f 3/10
[58] Field of Search ................ 267/65 B; 152/354

[56] References Cited
UNITED STATES PATENTS

| | | | |
|---|---|---|---|
| 3,033,557 | 5/1962 | Harris | 267/65 B |
| 3,186,885 | 6/1965 | Iles | 267/65 B |
| 3,498,355 | 3/1970 | Sperberg | 152/354 |
| 3,783,925 | 1/1974 | Boileau | 152/354 |

*Primary Examiner*—James B. Marbert
*Attorney, Agent, or Firm*—F. W. Brunner; R. P. Yaist

[57] ABSTRACT

A flexible resilient tubular member of the type used in a fluid pressure system. The member has a hollow body of fabric-reinforced elastomeric material and includes a flexing portion on at least one of its peripheral ends and a non-flexing connecting portion extending between the flexing portion and the opposite peripheral end of the member. At least one-half of the length of the connecting portion includes at least one layer of deformation resisting reinforcement in the form of a plurality of metallic elements such as metal cords or rods coextensive and integrally formed therewith to provide the connecting portion with increased rigidity and a stable axial configuration during use. The invention is particularly useful in vehicle suspension systems for achieving improved alignment between the flexible member and a piston member which moves within the flexible member during the operation of the system.

25 Claims, 18 Drawing Figures

PATENTED AUG 5 1975

SHEET 3

3,897,941

3,897,941

REINFORCED FLUID SPRING

BACKGROUND OF THE INVENTION

This invention relates to fluid springs, such as pneumatic or air springs, of the type used in fluid suspension systems. More specifically, this invention relates to fluid springs of the type in which a piston member moves within a flexible resilient member or diaphragm to cause the compression and expansion of the confined fluid. This invention has particular application to an improved construction of the flexible member of the spring to provide significantly increased rigidity in order to achieve improved axial alignment of the spring member and the piston member during the operation of the system.

Pneumatic or air springs are normally employed for shock-absorbing, load-supporting, and vibration isolation in vehicle suspension systems and other industrial and military applications. In the typical fluid pressure system a flexible resilient spring member having a hollow generally cylindrical body of fabric-reinforced elastomeric material, such as rubber or the like, is positioned between and attached to retaining elements to form a fluid-tight chamber capable of supporting a load. Customarily, an essentially inextensible bead containing a circumferential retaining wire or bead ring is formed at each peripheral end of the member to create a compression seal on the retaining elements. More recently, external sealing rings not formed integrally with the flexible spring member also have been used for this purpose. The retaining elements are adapted for movement relative to each other to cause the configuration of the spring member to change with such movement, thereby resulting in a change of the pressure of the fluid contained in the chamber. This compression and expansion of the column of the fluid contained in the chamber occurs during what is known as the deflection cycle of the spring which includes the compression and extension or rebound strokes.

In the so-called piston type spring, at least one of the retaining elements is a generally cylindrical piston usually made of metal or plastic which is employed to cause compression and expansion of the fluid contained in the spring. In the operation of this type spring, when the piston moves within the spring member the piston and the retaining elements attached to the other end of the spring member move relative to one another and a rolling motion is created in the toroidal loop portions of the wall of the spring member. The resulting change of configuration of the spring member consequently changes the pressure of the fluid contained in the chamber. An excellent detailed description of the construction, operation and production of the rolling lobe type air spring, which is one of the more common piston-type springs, is contained in Hirtreiter U.S. Pat. No. 3,043,582, the teachings of which are incorporated by reference herein.

The body of the flexible spring member of the rolling lobe type has a flexing portion at one peripheral end thereof and a generally cylindrical connecting portion extending between the flexing portion and the opposite peripheral end portion. The member may also have a flexing portion at each peripheral end thereof with the connecting portion extending between and joining each flexing portion. The flexible spring member contains tension-resisting reinforcement within the wall or body thereof typically comprised of at least two piles of biased oriented cords of textile fabric material extending from one end of the body to the other.

Those skilled in the art are aware that a particular problem associated with the operation of the piston type spring, for instance, in a vehicle suspension system, is the misalignment of the flexible spring member and the piston member during operation in the fluid pressure system. This misalignment condition can be largely attributed to springs having insufficient stiffness or rigidity in an axial direction and therefore being axially unstable. That is to say the springs have lacked sufficient axial rigidity in the non-flexing cylindrical wall of the connecting portion to prevent the tension-resisting reinforcement from buckling thereby causing severe distortion or deformation of the spring. This is particularly true in spring assemblies having a relatively high length to diameter ratio, for example, on the order of at least 2 to 1. Other factors contributing to the problem are pistons which are off center, tilted or have a curved path of travel. This problem can be particularly acute even when the length to diameter ratio is less than 2 to 1 in systems employing a piston member at each end of the flexible spring member. For example, such suspension systems may be used in recreational vehicles, buses, trucks, trailers and campers.

In the prior art, Boileau U.S. Pat. No. 3,438,309 discloses a pneumatic spring in which a separate metal sleeve or collar is used as a restraint against bulging of the outer wall of the flexible member or diaphragm. Since the metal sleeve is not formed integrally with the wall of the flexible member it is difficult to retain the relative positions ofo the flexible member and the collar as the flexible member is alternately inflated and deflated. Consequently, this structure has not proven to be entirely satisfactory.

Heretofore, attempts have also been made to improve the rigidity and stability of a fluid spring by incorporating additional fabric reinforcement of nylon, rayon and polyester materials extending generally longitudinally or axially of the flexible spring member in the non-flexing portions thereof. However, these previous constructions have not proven to be satisfactory in providing a significantly high degree of rigidity and have deformed or distorted under conditions of inflation unless used in sufficient amounts to make the air spring excessively bulky and expensive to produce.

Other materials of a higher modulus, although providing a high degree of rigidity, have also been used unsuccessfully for this purpose. Reinforcements of fiberglass cords, for instance, have proven to be too brittle with too little compressive strength and have broken during the flexing of the spring.

The problem of providing a fluid spring of sufficient rigidity to resist deformation is eliminated or significantly reduced by the present invention as will be hereinafter described.

OBJECTS OF THE INVENTION

It is a primary object of this invention to provide a flexible resilient tubular member of the type used in a fluid pressure system with the member being of an improved construction having a stable axial configuration to resist deformation under all conditions of normal use.

It is another object of the invention to provide a rolling lobe air spring construction which is axially reinforced to resist buckling or distortion of the spring member during the functioning of the spring.

It is another important object of the present invention to provide a vehicle suspension system including a pneumatic spring of improved construction which will result in prevention or reduction of misalignment between the flexible spring member and the piston member during the operation of such a system.

Other objects and advantages of this invention will become apparent hereinafter as the description thereof proceeds, the novel features, arrangements and combinations being clearly pointed out in the specification as well as the claims thereunto appended.

In accordance with the present invention, it has been discovered that the above objects and advantages are accomplished by a flexible, resilient tubular member of the type used in a fluid pressure system in which the member undergoes movement causing a rolling motion in the member. The member comprises a hollow body of flexible polymeric material having tension resisting reinforcement therein with the body having a flexing portion at one peripheral end thereof and a connecting portion extending longitudinally of the member between the flexing portion and the opposite peripheral end thereof. At least one-half of the length of the connecting portion includes at least one layer of deformation-resisting reinforcement coextensive and integrally formed therewith. The reinforcement is comprised of a plurality of metallic elements disposed around the circumference of the connecting portion and extending generally longitudinally of the member to support the tension-resisting reinforcement and provide the connecting portion with increased rigidity and a stable axial configuration under conditions of normal use.

DESCRIPTION OF THE PREFERRED EMBODIMENTS

Figure 1:
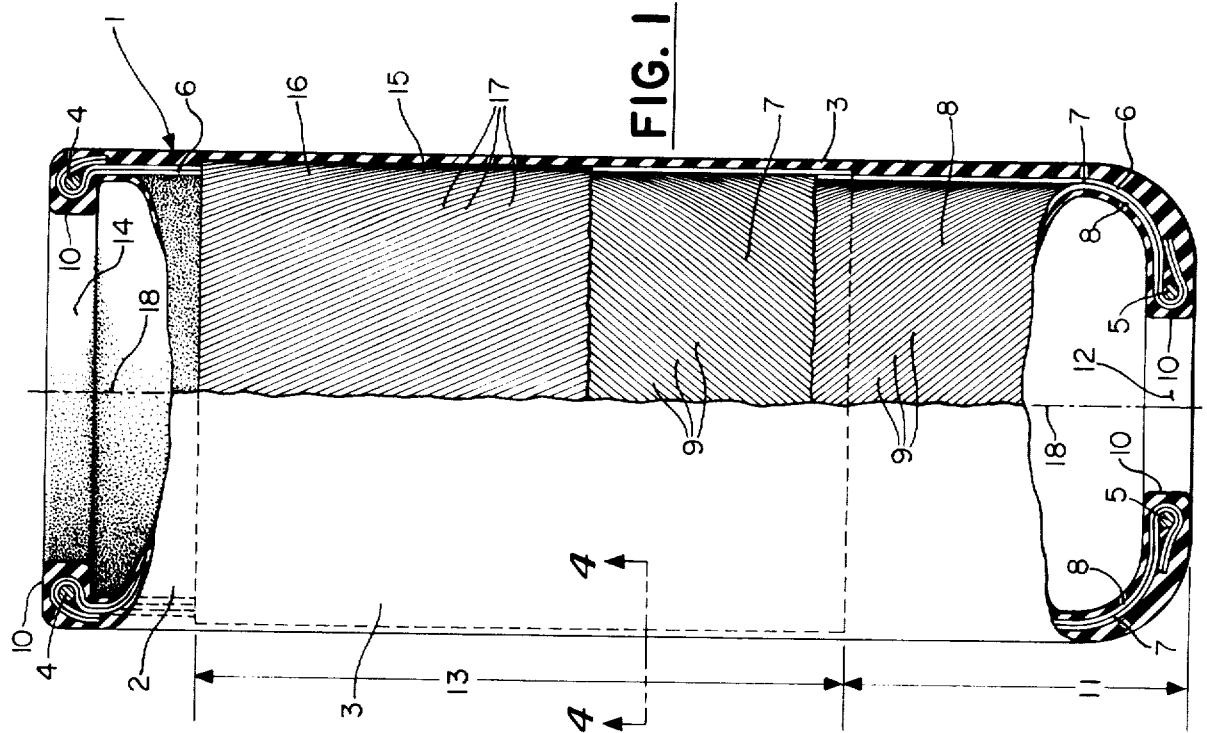
FIG. 1 is an elevational view shown partly in section of the flexible resilient tubular member of the invention in its molded condition with parts being broken away to more clearly illustrate the invention.

In FIG. 1, the flexible resilient tubular member 1 of the invention is shown which in this instance is a reversible sleeve or rolling lobe type air spring. The member is shown in its molded form before installation in a fluid pressure system such as a vehicle suspension system. The flexible member 1 is a hollow container having a body 2 in the form of a generally tubular sleeve with a wall 3 which tapers to a bullet shape at one end and an annular metal ring or bead ring 4 and 5 at each peripheral end thereof. The bead rings 4 and 5 may also be in the form of multiple turns of a wire strand instead of a ring. The member 1 is composed of flexible polymeric material such as natural or synthetic rubber or other elastomeric material containing tension resisting reinforcement 6 therein. The reinforcement may be in the form of textile fabric layers or plies 7 and 8 including a plurality of biased oriented cords 9 extending from one end of the body to the other. The fabric plies 7 and 8 pass around the bead rings 4 and 5 and form a bead 10 immediately adjacent thereto. The tension-resisting cords 9 are preferably formed of nylon but other natural or synthetic textile fabric may also be used for this purpose such as cotton, rayon or polyester. In addition, other less conventional materials may sometimes be used such as fine stranded steel either used as single strands or braided and cabled. It is understood that all these beforementioned materials are usually treated with a suitable bonding agent to affect adhesion with the rubber of the body.

The body 2 includes a flexing portion 11 at one peripheral end 12 thereof and a non-flexing generally cylindrical connecting portion 13 extending longitudinally or axially of the member 1 between the flexing portion 11 and the opposite peripheral end portion 14 thereof to join or connect these portions. For the purposes of this invention, the terms "flexing portion" and "non-flexing portion" will be used to designate the portions of the walls of the member which do or do not undergo the flexing rolling motion during the operation of the spring.

At least one-half of the length of the connecting portion 13 includes at least one layer 15 of untensioned deformation-resisting reinforcement 16 coextensive and integrally formed therewith. This reinforcement 16 may be referred to as "untensioned" since it does not provide tension-resistance as does the biased laid reinforcement 6 and therefore does not extend for the full axial length of the body 2 of the membere 1. The reinforcement 16 includes a plurality or group of metallic elements 16. The elements 16 are disposed in substantially a parallel relationship to each other around the circumference of the member and extend generally longitudinally of the member to support the tension-resisting reinforcement 6 in order to provide the connecting portion 13 with increased rigidity and a stable axial configuration under conditions of inflation. Accordingly, the reinforcement 16 functions to retain the generally cylindrical shape of the connecting portion 11 throughout the operation of the spring.

It is preferred that each of the elements 17 of the reinforcement be a relatively thin flexible cord or cable composed of strands of high modulus metal filaments being generally less flexible than the tensile resisting cords 9. The cords 17 preferably are a fine stranded steel wire used as single strands or in a braided or cabled construction. As specifically illustrated in FIGS. 2–4, the layer 15 of reinforcement 16 may be one band or belt containing a plurality of high carbon steel cords or cables embedded, for example, in an elastomeric matrix. These cords 17 for instance may be a stranded cable structure of the type commonly used in the construction of pneumatic tires. This structure provides a portion 13 having a wall 3 of substantially high rigidity.

Even though flexible cords or cables are preferred, the metallic elements 17 may also take other forms. For example, solid, rigid elements such as straight or crimped metal rods, bars or slats of a relatively thin cross section may be embedded in the wall 3 of the connecting portion 13. These rods, bars or the like may be composed of any well-known metallic materials such as steel, bronze or aluminum.

The elements or cords 17 normally should extend around the entire circumference of the member 1 for a majority of the length of the portion 13. For optimum stiffness or rigidity the elements 17 should be formed coextensive with the portion 13 along substantially its entire axial length. The elements may each have a diameter or cross-sectional dimension of from about 0.003 to about 0.188 of an inch (0.076 mm to about 4.775 mm) with the distance between each element being from about 0.003 to about 0.375 of an inch (0.076 mm to about 9.525 mm).

Figure 2:
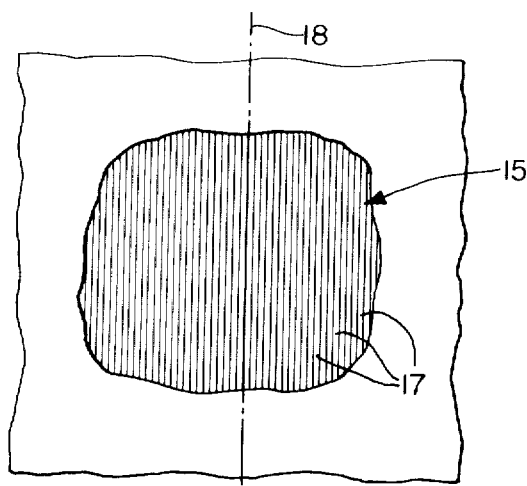
FIGS. 2 and 3 are enlarged fragmentary views of the reinforcement of the invention to illustrate the angular disposition of the metallic elements of the reinforcement.
Figure 3:
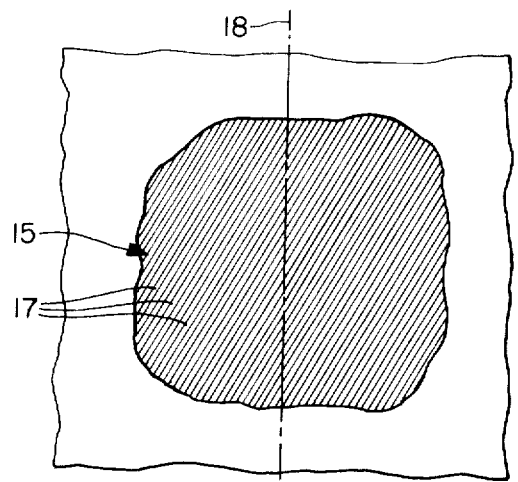

For the purposes of this invention, the terms "generally longitudinally or axially of the member" as used in regard to the elements 17 of the deformation-resistant axially oriented reinforcement 16 are intended to describe those fluid spring structures in which the elements or cords are disposed at such an angle as to achieve the optimum stiffness or rigidity. For this purpose, during the manufacture of the member 1 the cords 17 in each band 18 should be disposed at an angle of from about 0° to about 60°. In this application all angles will be measured with respect to an imaginary line 18 extending longitudinally of the member 1 which would be formed by a plane through the axis of the member and intersecting the surface thereof. For example, the cords 17 may be laid parallel to the imaginary line 18 as illustrated in FIG. 2 or may be laid at various angles to the imaginary line up to about 60° as illustrated in FIG. 3. In this regard, of course, when solid metal elements are used they normally are positioned at least generally parallel to the imaginary line since they cannot be easily positioned on an angle to the imaginary line.

Figure 4:
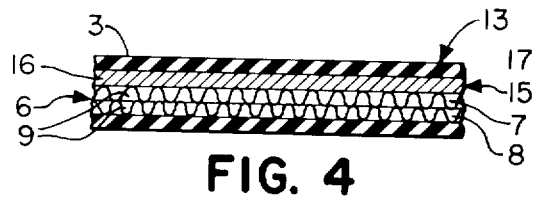
FIG. 4 is an enlarged sectional view taken on line 4—4 of FIG. 1.

As best seen in FIG. 4, the untensioned or non-tensile resisting reinforcement is disposed radially outwardly of the bias-laid plies 7 and 8 of fabric reinforcement 6.

Figure 5:
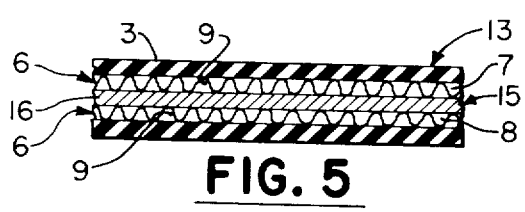
FIGS. 5, 6 and 7 are modifications of the invention shown in FIG. 4.
Figure 6:
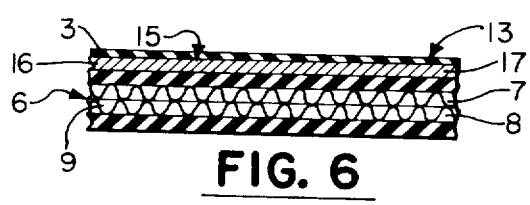
Figure 7:
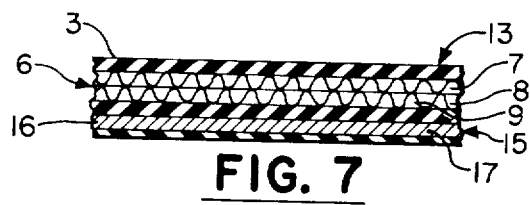

Of course many modifications of the particular arrangement shown in FIG. 4 are possible as illustrated in FIGS. 5, 6 and 7. For example, as shown in FIG. 5, the reinforcement 16 for the purpose of providing rigidity, may be layer 15 of cords or elements 17 disposed between the plies 7 and 8 of tension-resisting reinforcement 6.

FIG. 6 illustrates that the layer or belt 15 of metallic cords 17 of the deformation-resisting reinforcement 16 may form the outer peripheral surface of the wall 3 of the connecting portion 13.

Alternately as shown in FIG. 7, the metallic cords 17 of the reinforcement 16 may be disposed radially inwardly of the non-metallic fabric reinforcement 6 and, for example, form the inner peripheral surface of the wall 3 of the connecting portion 13. It will be recognized by those having skill in the art that it is more difficult to manufacture the fluid spring member when the layer or band of steel cords is disposed at or near the inner peripheral surface. Therefore, the construction shown in FIG. 7 may not be as desirable as other constructions.

Figure 8:
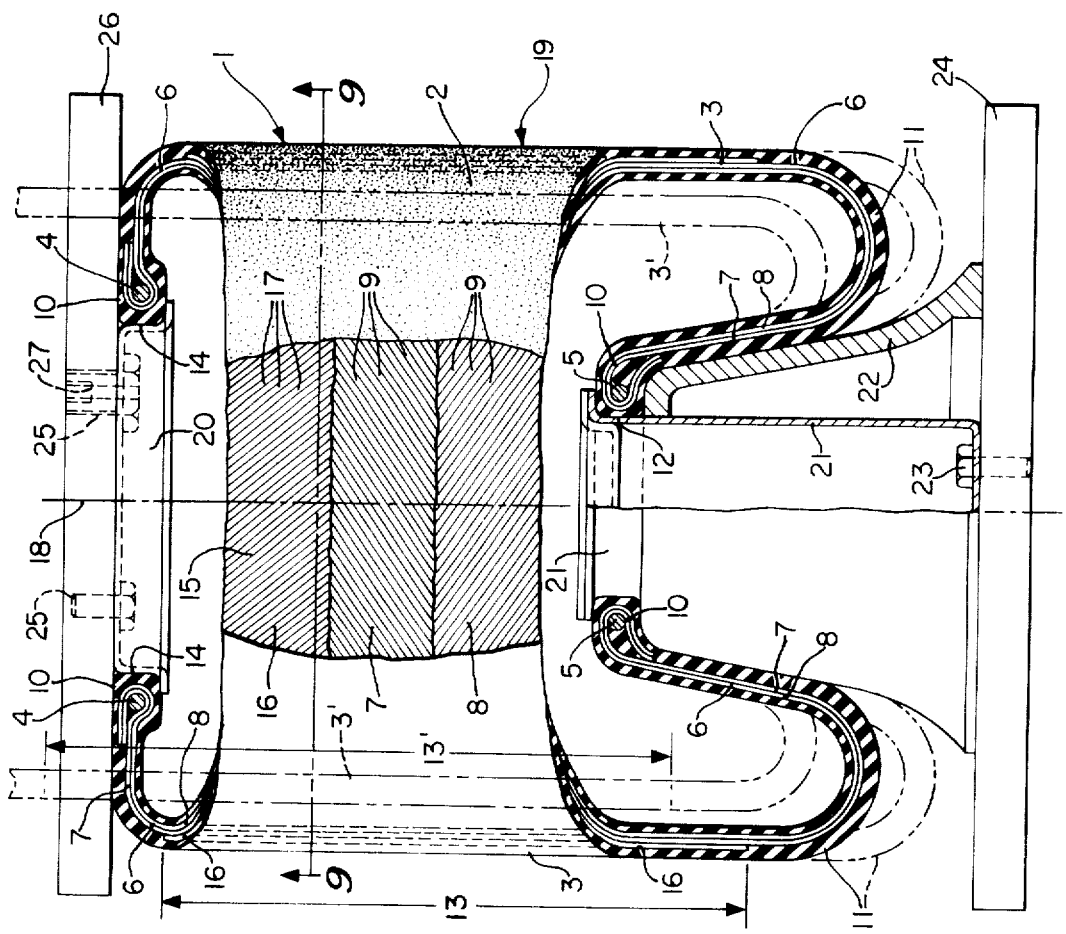
FIG. 8 is an elevational view shown partly in section of the flexible member of FIG. 1 in its normal operating or design position in a fluid pressure system with parts being broken away to more clearly illustrate the invention.

The flexible member 1 as inflated in operation under load is shown in FIG. 8 in a typical rolling lobe air spring assembly 19 which is normally employed in a vehicle suspension system. As illustrated, the member 1 is placed between the upper metal retaining element 20 and the lower metal retaining element 21 and attached thereto by means of the beads 10 which provide a mounting means at each end 12 and 14 of the member 1. The beads 10 also create a compression seal on the retaining elements 20 and 21 to form an air-receiving chamber and the bead rings 4 and 5 function to maintain the shape of the member 1 and prevent its undue expansion while being inflated. The lower retaining element 21 fits into a bell-shaped piston 22 in the form of a cylindrical metallic member and is secured by means of bottom mounting studs 23 to a bottom end plate 24 which, for example, may be the axle pad of a vehicle. The upper retaining element 20 is similarly secured by means of top mounting studs 25 to the upper end plate 26 which may be, for example, the vehicle frame. The upper retaining element 26 also includes an air fitting 27 included within one of the studs 25 to allow inflation and deflation of the member 1.

When the piston 22 travels within the flexible member 1, the elements 20 and 21 move relative to each other and change the configuration of the member 1 by creating a rolling motion in the flexing portion 11 of the wall 3 of the member in the direction of the movement which is shown in broken lines. The portion 11 which is also the so-called rolling lobe portion of the member defines a toroidal loop at the small bead end 12 of the chamber 1. The column of air or other fluid contained in the chamber of the member 1 is compressed and expanded by the reciprocating action of the piston 22 and thereby is able to support a load, such as a vehicle body. The generally bullet shape of the member at the end 12 enables the wall 3 to conform more readily to the contour of the piston 22 as it travels within the member 1. Alternately when the fluid is a liquid, and consequently largely incompressible it acts as a pressure transfer medium to balance the load between, for example, the front and rear vehicle suspensions by compensating for pressure changes which may occur. Those skilled in the art are aware that this can be accomplished, for instance, by means of an accumulator located in the fluid pressure system.

Figure 9:
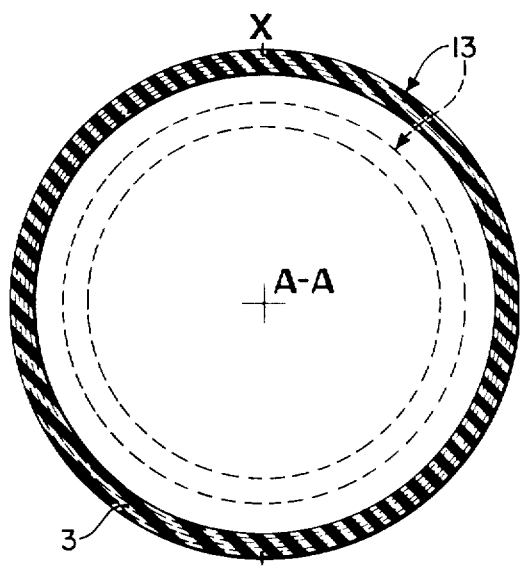
FIG. 9 is an enlarged section taken on line 9—9 of FIG. 8 showing the stable axial configuration of the flexible member.

The function of the non-tension resisting reinforcement 16 is illustrated by reference to FIG. 8 as the flexible spring member 1 is under compression and its length is shortened the metallic elements or cords 17 spread or panograph from an "as molded" angle of from about 20° to 30° (FIG. 1) to an angle of from about 40° to 50°. The elements or cords 9 of the tension-resisting reinforcement 6 being generally more flexible, panograph from an as molded angle of approximately 35° to 50° (FIG. 1) to an angle of approximately 55° to 65°. In this way the generally cylindrical wall 3 of the connecting portion 13 after inflation of the spring member is substantially concentric with the wall of the connecting portion before inflation of the spring member, the latter being represented by broken lines in FIGS. 8 and 9. In other words, as illustrated in FIG. 9 the connecting portion 13 has a stable cylindrical configuration during its operation in the system when the member 1 is inflated so that points X and Y on diametrically opposite sides of the wall 3 of the connecting portion 13 are substantially equidistant from the longitudinal axis A—A of the member 1 passing through the longitudinal centerplane of the member. This construction provides improved axial alignment of the spring member and the piston member during the operation of the system. This is particularly important when the height or length to diameter ratio of the fluid spring is at least 2 to 1.

Figure 9A:
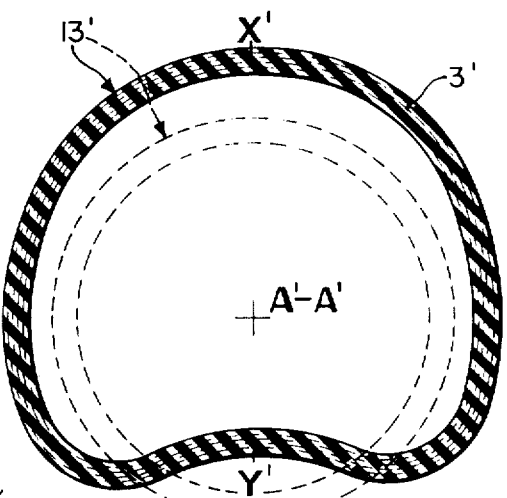
FIG. 9A is a view similar to FIG. 9 but showing a flexible spring member without the reinforcement of the invention and the resulting deformed condition of the member.

Without the support provided by the deformation-resisting reinforcement 16, the reinforcement 6 would buckle causing the wall 3' of the portion 13' to bulge upwardly and distort as shown in FIG. 9A. Accordingly, point X' on the upper portion of the wall 3' is at a greater distance from the axis A'—A' than is point Y' on the lower portion of the wall 3'. The wall of the connecting portion before inflation is again represented by broken lines.

Figure 10:
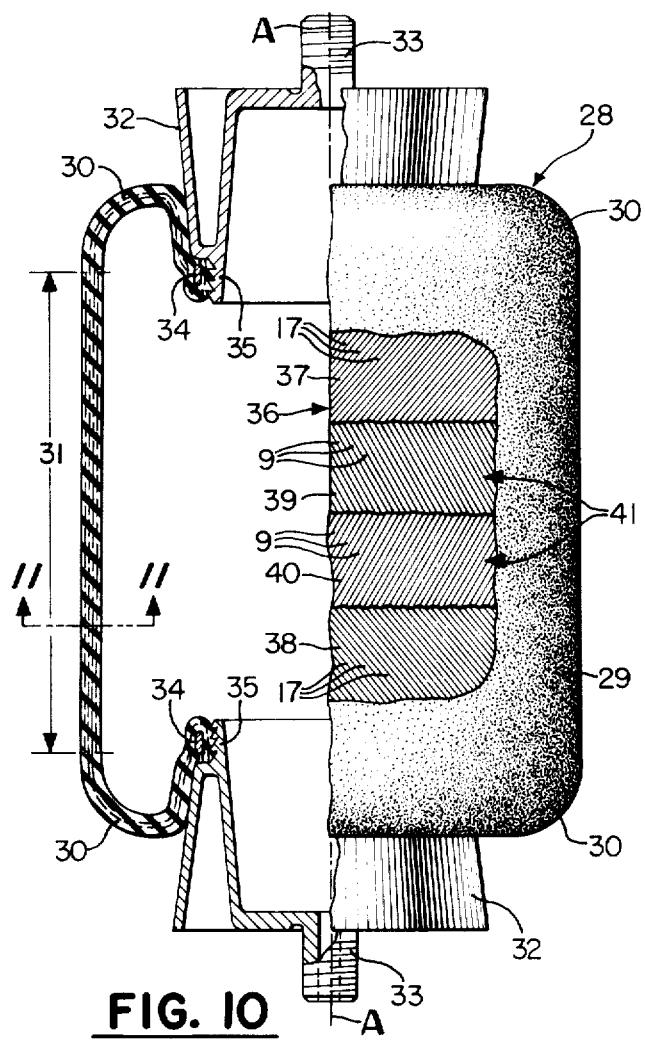
FIG. 10 is an elevational view of another form of the invention illustrating a fluid spring including another type flexible member with parts broken away to show the reinforcement of the invention.

FIG. 10 illustrates another preferred embodiment of the invention in which a fluid spring member 28 is shown prior to its installation in a vehicle suspension system. The member 28 includes a body 29 having a flexible portion 30 at each end thereof and a connecting portion 31 extending between and joining each flexing portion 30. Reciprocating means such as pistons 32 are received in each end during the operation of the system. The pistons 32 include threaded mounting studs 33 used for installation in the suspension system. In this case the member 28 does not include beads at each axial end to provide a mounting means but instead sealing rings 34 are applied around the outer peripheral surface of each axial end of the members 28 and the rim 35 of the piston 32 which fits within the member 28 is serrated to provide positive sealing engagement. The longitudinal axis A—A of the body of the spring member is disposed generally horizontally. The length to diameter ratio of the fluid spring assembly in which the flexible spring member 28 functions may range from 1.3 to 1 or may be as much as 2.5 to 1.

Figure 11:
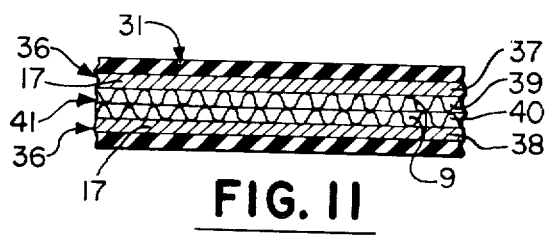
FIG. 11 is an enlarged sectional view taken on line 11—11 of FIG. 10.

In this type spring used principally in suspension systems for vehicles such as buses, trucks, trailers and campers it may be desirable to provide a fluid spring construction which will permit a more compact, stable and high deflection suspension system resulting in a smoother safer ride. As best shown in FIG. 11, the deformation resisting reinforcement 36 used to achieive rigidity in the portion 31 may be comprised of two layers 37 and 38 with one of the layers 37 being disposed radially outwardly of biased oriented plies 39 and 40 of tension-resisting cord reinforcement 41 and the second layer 38 being disposed radially inwardly of the plies 39 and 40. Preferably in this arrangement the metal cords 17 are contained in two bands or belts forming the layers 37 and 38 in which the cords of one band are disposed at a different angle with respect to the cords of the other band. The cords 9 contained in the plies 39 and 40 of tension-resisting reinforcement 41 are also oppositely biased. For example, during the operation of the spring the cords 17 may be disposed at an angle of from about 40° to about 50° and the cords 9 may be disposed at an angle of from about 50° to about 60° each with respect to the imaginary line 18 on the surface of the member 28.

Other modifications of the invention are, of course, possible as illustrated in FIGS. 12, 13, 14 and 15.

Figure 12:
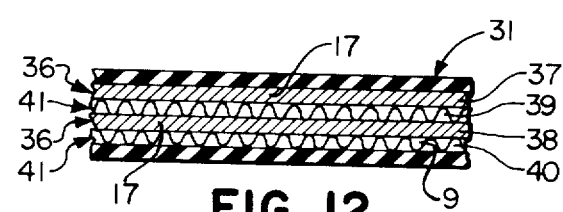
FIGS. 12, 13, 14 and 15 are modifications of the invention shown in FIG. 11.

FIG. 12 illustrates that one layer 37 of untensioned reinforcement 36 may be disposed radially outwardly of a ply 39 of the radially outwardmost ply of tension-resisting reinforcement 41 and the second layer 38 of reinforcement 36 may be disposed between the plies 39 and 40 of tensson-resisting reinforcement 41.

Figure 13:
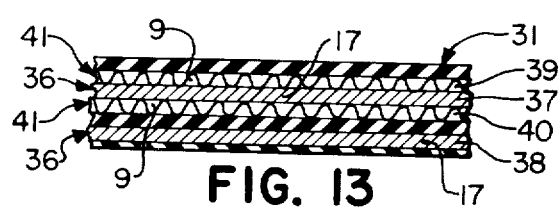

In FIG. 13 one layer 37 of reinforcement 36 is disposed between the plies 39 and 40 of biased-oriented tension-resisting reinforcement 41 and the second layer 38 of reinforcement 41 is disposed radially inwardly of the radially inwardmost ply 40 of tension-resisting reinforcement 41 and is embedded in a rubber material to form the inner peripheral surface of the connecting portion 31 of the member 28.

Figure 14:
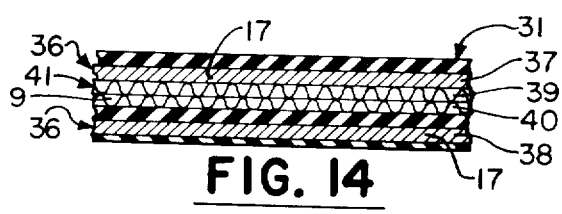

In FIG. 14 a construction is shown which is similar to that of FIG. 13 except that the layer 37 of reinforcement 36, instead of being between the plies 39 and 40 of tension-resisting reinforcement 41, is disposed radially outwardly thereof. As stated previously, the construction shown in FIGS. 13 and 14 may not be as easily produced because of the difficulty of aligning the metallic cords or elements at the inner peripheral surface of the member.

Figure 15:
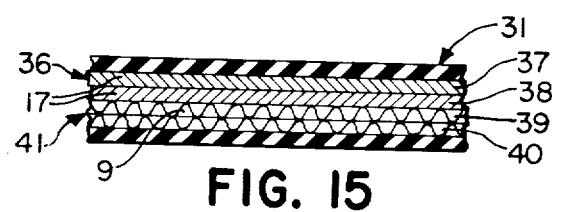

Alternatively, in another practical construction both layers 37 and 38 of the reinforcement 36 may be disposed radially outwardly of the plies 39 and 40 of tension-resisting reinforcement 41 as shown in FIG. 15. Both layers 37 and 38 may also be disposed radially inwardly of the tension-resisting plies 39 and 40 or even between these plies if desired. However, these latter constructions are not considered to be as commercially practical because of the relative difficulty of manufacture.

Also, it will be recognized that the non-tension resisting reinforcement may include two layers with one of the layers forming the outer peripheral surface of the connecting portion and the other layer forming the inner peripheral surface of the connecting portion.

Figure 16A:
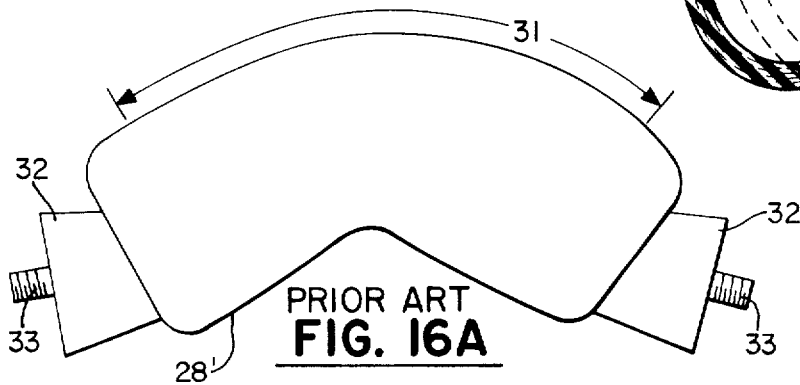
FIG. 16A is a view similar to that of FIG. 16 but showing the operation of a fluid spring in which the flexible member does not include the reinforcement of the invention.
Figure 16:
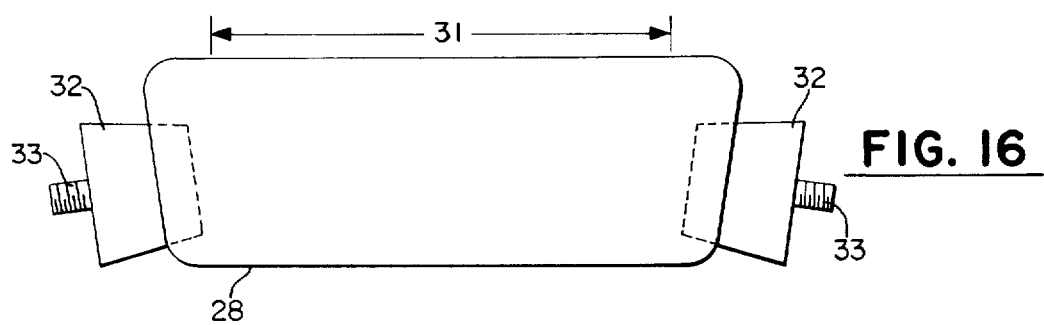
FIG. 16 is a view similar to that of FIG. 10 showing the operation of the spring of FIG. 10 in which the flexible member has a stable cylindrical configuration.

A typical condition of the fluid spring member 28 during operation is illustrated in FIG. 16. It can be seen that the rigid connecting portion 31 of the member including the reinforcement 36 of the invention has a stable cylindrical configuration even though the pistons 32 are slightly off center with relation to the member. On the other hand, as illustrated in FIG. 16A, the connecting or non-flexing portion 31' of a fluid spring member 28', not including the reinforcement 36 therein, severely buckles or distorts during operation. This distortion may lead to the detachment of the pistons 32' from the ends of the flexible member.

In building the flexible members of the present invention the various components are built up on a mandrel in a conventional manner well known in the art with the assembled components thereafter being vulcanized under heat and pressure in conventional equipment for that purpose.

The following example further illustrates the objects and adantages of this invention:

EXAMPLE

The following flexible fluid spring members were produced in order to demonstrate the comparative utility of the invention. All members were produced having a body of rubber with an inner liner thickness of about 0.035 of an inch and reinforced by two plies of nylon cords laid on an opposite bias of about 35° or 36° to form the tension-resisting reinforcement extending from one end of the body to the other. The angle of the tension-resisting cords after inflation of the spring was from about 50° to about 60°. Each spring assembly tested was a rolling lobe air spring of the type shown in FIG. 10 having a design height of 13.5 inches and a travel limit of 8.5 to 19.00 inches during its compression and extension cycles. The spring member had a working diameter of from about 7.95 to about 8.60 inches and a diameter of 8.60 inches at maximum inflation.

Each spring member had a flexing portion at each end thereof with a connecting portion extending between and joining each flexing portion. The length of the connecting portion of each member was approximately 9 inches. Unless otherwise stated, each connecting portion was provided with deformation-resisting reinforcement comprising one or more layers or bands of stranded or twisted elements of various materials laid on a bias of from about 20° to 30° in an unmolded condition and from about 40° to about 50° in the molded or inflated condition. Bands of various sizes ranging from 4 to 9 inches were provided in the approximate center of the connecting portion of the member. All fabric materials were treated with suitable bonding agents prior to their incorporation into the body of the spring.

A number of spring members were produced of each material. The spring members are labeled as springs A through I and were constructed as follows.

Members identified as Springs A included one layer or ply of rayon fabric cords of 2200 denier, two ply 3.9Z, 5.25S turns per inch construction having a diameter of from 0.024 to 0.026 of an inch and containing 23 ends per inch. The band of rayon cords was placed radially outwardly of the two plies of tensile resisting cords similar to the disposition of the band of the spring member of FIG. 4.

Members identified as Springs B were constructed of the same material as Springs A but included an additional layer or band of rayon cord fabric disposed radially outwardly of the plies of nylon cords in a manner similiar to the band of the spring member of FIG. 15.

Members identified as Springs C were constructed of two plies or bands of nylon fabric cords of 1260 denier, two ply 10.0Z, 10.0S turns per inch construction having a diameter of about 0.027 or 0.028 of an inch and containing 28 ends per inch. The bands of nylon fabric cords were positioned singularly and in pairs both radially outwardly and radially inwardly of the tension-resisting nylon plies.

Members identified as Springs D were formed of the same nylon material as Springs C except four plies of nylon cords were used. Two cord layers were positioned radially outwardly of the tension-resisting cords and two cord layers were positioned radially inwardly thereof.

Members identified as Springs E were axially reinforced with one ply of fiberglass cords of 330 denier 1 ply, 1.5Z, 1.5S turns per inch construction having a diameter of 0.021 of an inch and containing 24 ends per inch. The band of fiberglass cords was disposed radially outwardly of the tension-resisting reinforcement of the spring member.

Members identified as Springs F were constructed similarly to Springs E but included an additional band of fiberglass cords disposed radially outwardly of the tension-resisting reinforcement adjacent to the first band of fiberglass cords.

The members identified as Springs G were constructed in accordance with the present invention and were reinforced with a single ply or band of brass coated high carbon steel cords including seven strands of four filaments each of 0.150 mm in diameter, a wrap of one filament of 0.150 mm diameter having an overall cable diameter of 1.330 mm with a lay of 9.5 S, 9.5 Z and 3.5 S mm per turn and containing 14 ends per inch. Each cord had an elongation at break of 1 to 3 percent and a tensile strength of 260 to 300 kg/sq mm in filament (400,000 ± 25,000 psi).

Members identified as Springs H were also constructed in accordance with the practices of this invention and were reinforced with a single ply or band or brass coated high carbon steel cables of a lighter gauge than those used in Samples G. The cords included a strand of four filaments of 0.220 mm diameter, a wrap of one filament of 0.150 mm diameter and had an overall cable diameter of 0.80 mm with a lay of 9.5 S and 3.5 Z mm per turn and contained 17 ends per inch. Each steel cord had an elongation at break of 1 to 3 percent and a tensile strength of 260 to 300 kg/sq mm in filament (400,000 ± 25,000 psi). The band containing the steel cords or cables was disposed radially outwardly of the nylon reinforcement as shown in FIG. 5. As in the case of Springs G the band containing the steel cables was positioned radially outwardly of the plies of tension-resisting nylon reinforcement.

Sample I was a single flexible member which was not reinforced by bands of stranded elements but included a series of approximately 100 solid bronze rods embedded in a parallel relationship to each other in the connecting portion. The rods were provided in a single layer around the circumference of the connecting portion spaced radially outwardly of the tension-resisting reinforcement with each rod in the layer extending substantially longitudinally or axially of the member. Each rod had a diameter of one-eighth of an inch and was 9 inches in length to thereby be substantially coextensive with the connecting portion of the member.

The samples A through I were tested in the following manner on a test unit constructed to simulate an actual vehicle suspension system of the type employed in a camper or trailer. The unit included suspension control arms mounted on a large beam and actuated by hydraulic cylinders. The fluid spring assembly was mounted for testing in the manner shown in FIG. 10 with the longitudinal axis of the flexible spring member disposed generally horizontally with metallic pistons at each end of the member. The tests were conducted at 45 to 50 cycles per minute with the spring traveling from approximately 8½ to 19 inches during its compression and extension cycles. The tests were conducted at room temperature and at approximately 65 psi at mid point or design position, 45 to 50 psi at full extension and 95–105 psi at full compression.

The operation of each spring was observed to determine if buckling or bulging of the tension-resisting reinforcement occurred to cause distortion or deformation of the connecting portion of the member. The results are listed in the table below with the term "rigid" being used to indicate satisfactory results with the desired axial rigidity being achieved and the term "deform" indicating unsatisfactory results with insufficient axial rigidity to prevent deformation.

Band Width (inches)

| Spring | 4 | 5 | 6 | 7 | 8 | 9 |
|---|---|---|---|---|---|---|
| A | deform | deform | deform | deform | deform | deform |
| B | deform | deform | deform | deform | rigid | rigid |
| C | deform | deform | deform | deform | deform | deform |
| D | deform | deform | deform | deform | deform | deform |
| E | deform | deform | deform | deform | deform | deform |
| F | deform | deform | deform | rigid* | rigid* | rigid* |
| G | deform | rigid | rigid | rigid | rigid | rigid |
| H | deform | rigid | rigid | rigid | rigid | rigid |
| I | not tested | not tested | not tested | not tested | not tested | rigid |

Remarks

| Spring | |
|---|---|
| A | Unsatisfactory |
| B | Satisfactory at wider widths |
| C | Unsatisfactory |
| D | Unsatisfactory |
| E | Unsatisfactory-cords frayed and broken |
| F | *Unsatisfactory-cords frayed and broken |
| G | Very satisfactory |
| H | Very satisfactory |
| I | Very satisfactory |

These results indicate that the Springs G and H constructed in accordance with the present invention performed most satisfactorily over the range of band widths tested. Spring I of the invention was also very satisfactory at the width tested. It is apparent from the results that only one ply or band of metallic stranded elements or one layer of solid metal rods are needed for adequate stiffness or rigidity. The axial reinforcement should extend for at least one-half of the length of the connecting portion of the member since some bulging or distortion occurs in the unreinforced areas of the connecting portion at a low band width. On the other hand, even in this case the area of the connecting portion containing the deformation resisting metallic reinforcement was rigid.

The only other spring construction which performed satisfactorily was that of Springs B including two bands of rayon reinforcement and this was true only in the 8 and 9 inch width range. It should be noted in this regard, however, that Springs B were observed to be less rigid than Springs G, H, and I and were therefore less satisfactory for the purpose intended.

Although fiberglass constructions of two plies represented by samples F were generally rigid at the 7, 8 and 9 inch band widths, they were unsatisfactory due to the breaking of the cord ends.

While certain representative embodiments and details have been shown for the purpose of illustrating the invention, it will be apparent to those skilled in the art that various changes and modifications may be made therein without departing from the spirit or scope of the invention.

We claim:

1. A flexible, resilient tubular member of the type used in a fluid pressure system in which the member is subjected to external forces acting substantially coincident to and along its longitudinal axis and thereby undergoes movement causing a rolling motion forming a rolling lobe in at least one peripheral end portion of the member, said member comprising a hollow body of flexible polymeric material having tension resisting reinforcement therein, said body having a flexible portion at one peripheral end thereof and a connecting portion extending longitudinally of said member between said flexing portion and the opposite peripheral end thereof, at least one-half of the length of said connecting portion including at least one layer of deformation resisting reinforcement coextensive and integrally formed therewith, said deformation resisting reinforcement comprised of a plurality of metallic elements disposed around the circumference of said connecting portion and extending generally longitudinally of said member to support said tension resisting reinforcement and provide said connection portion with increased rigidity and a stable axial configuration under conditions of normal use.

2. The member as claimed in claim 1 wherein said body has a flexing portion at each peripheral end thereof and said connecting portion extends between and joins each said flexing portion.

3. The member as claimed in claim 1 wherein said deformation-resisting reinforcement is disposed radially outwardly of said tension-resisting reinforcement.

4. The member as claimed in claim 1 wherein said deformation-resisting reinforcement is disposed radially inwardly of said tension-resisting reinforcement.

5. The member as claimed in claim 1 wherein said body includes at least two plies of tension-resisting reinforcement and said deformation-resisting reinforcement is disposed between any two said plies of tension-resisting reinforcement.

6. The member as claimed in claim 3 wherein said deformation-resisting reinforcement forms the outer peripheral surface of said connecting portion.

7. The member as claimed in claim 4 wherein said deformation-resisting reinforcement forms the inner peripheral surface of said connecting portion.

8. The member as claimed in claim 5 wherein said deformation-resisting reinforcement is comprised of two layers and one said layer is disposed radially outwardly of said plies of tension-resisting reinforcement.

9. The member as claimed in claim 5 wherein said deformation-resisting reinforcement is comprised of two layers and one said layer is disposed radially inwardly of said plies of tension-resisting reinforcement.

10. The member as claimed in claim 1 wherein said metallic elements are solid and rigid.

11. The member as claimed in claim 1 wherein said metallic elements are flexible.

12. The member as claimed in claim 11 wherein said deformation-resisting reinforcement is comprised of one band including a plurality of metal cords.

13. The member as claimed in claim 12 wherein said cords in said band are disposed at an angle of from about 0° to about 60° as measured with respect to an imaginary line extending longitudinally of the member which would be formed by a plane through the axis of the member and intersecting the surface thereof.

14. The member as claimed in claim 13 wherein said deformation-resisting reinforcement is comprised of two bands of metal cords in which the corods of one said band are disposed at different angles with respect to the cords of the other said band.

15. The member as claimed in claim 14 wherein each said cord is a fine stranded steel wire.

16. A flexible resilient fluid spring member having a generally tubular hollow body of elastomeric material containing tension-resisting reinforcement therein comprised of a plurality of biased oriented cords extending from one end of the body to the other, said member of the type used in a fluid pressure system in which the end portions of said member are attached to retaining elements to form a fluid-tight chamber capable of supporting a load with said elements adapted for movement relative to each other as the result of a reciprocating means which moves within said member causing a rolling motion in the wall of the body in the direction of such movement thereby defining a toroidal loop, said body comprising at least one flexing portion at one end thereof which receives the reciprocating means therein, said portion having a toroidal shape during the operation of the systetm, a generally cylindrical non-flexing portion comprising a wall of substantially high rigidity extending along the axial length of said member conneccting said flexing portion with the opposite end thereof, said non-flexing portion including at least one group of non-tension resisting cords of flexible metallic material substantially coextensive and integrally formed therewith, said non-tensile resisting cords extending generally axially of said member and being of less flexible than said tensile resisting cords to support said tension-resisting reinforcement and provide said connecting portion with a stable cylindrical configuration during its operation in the system when said member is inflated so that points on diametrically opposite sides of the wall of said connecting portion are substantially equidistant from the longitudinal axis of the member passing through the longitudinal center plane of the member.

17. The fluid spring as claimed in claim 16 wherein each said non-tension resisting cord is comprised of strands of metal filaments and has a diameter of from about 0.003 to about 0.150 of an inch.

18. The fluid spring as claimed in claim 17 wherein said non-flexing portion is comprised of a band containing a plurality of steel cords and the distance between each adjacent steel cord is from about 0.003 to about 0.375 of an inch.

19. The fluid spring member as claimed in claim 16 wherein said body has a flexing portion at each end thereof and a reciprocating means is received in each said end during the operation of the system.

20. The fluid spring member as claimed in claim 19 wherein the longitudinal axis of said body is disposed generally horizontally.

21. In a fluid spring including the combination of a flexible resilient spring member having:

A. a hollow body of elastomeric material with layers of tension-resisting reinforcement therein and having a flexing portion at one end thereof, a connecting portion extending between said flexing portion and the opposite end thereof;

B. a pair of spaced retaining elements with each being attached to an end portion of said spring member to form a fluid-tight chamber capable of supporting a load with said elements being movable relative to each other to cause a change in the configuration of the spring member and in the pressure of the fluid in the chamber, at least one of said elements being a generally cylindrical relatively rigid piston member which moves within said spring member to cause a rolling motion therein; and C. the improvement comprising a layer of shape retaining, generally axially oriented reinforcing material integrally formed with said connecting portion and extending for at least a majority of the length thereof, said shape retaining material comprised of a plurality of flexible metallic elements disposed in a parallel relationship around the circumference of said connecting portion with said connecting portion thereby having a stable axial configuration under conditions of inflation to provide improved axial alignment of the spring member and the piston member during the operation of the system.

22. The fluid spring as claimed in claim 21 wherein said connecting portion has a wall of generally cylindrical configuration and the wall before inflation of the spring member is substantially concentric with the wall after inflation of the spring member.

23. The fluid spring as claimed in claim 22 wherein the length to diameter ratio of the spring is at least 2 to 1.

24. The fluid spring as claimed in claim 22 wherein said body includes a flexing portion at each end thereof and each said retaining element comprises a generally cylindrical relatively rigid piston member which moves within said body.

25. The fluid spring as claimed in claim 24 wherein the length to diameter ratio of the spring is from about 1.3 to about 2.5 to 1.

* * * * *